Sept. 16, 1930.    H. W. BLAISDELL    1,776,062
FILTER BED CLEANER
Original Filed June 13, 1922    7 Sheets-Sheet 2

Sept. 16, 1930.     H. W. BLAISDELL     1,776,062
FILTER BED CLEANER
Original Filed June 13, 1922     7 Sheets-Sheet 3

Inventor:
Hiram W. Blaisdell
by B C Stickney
Attorney

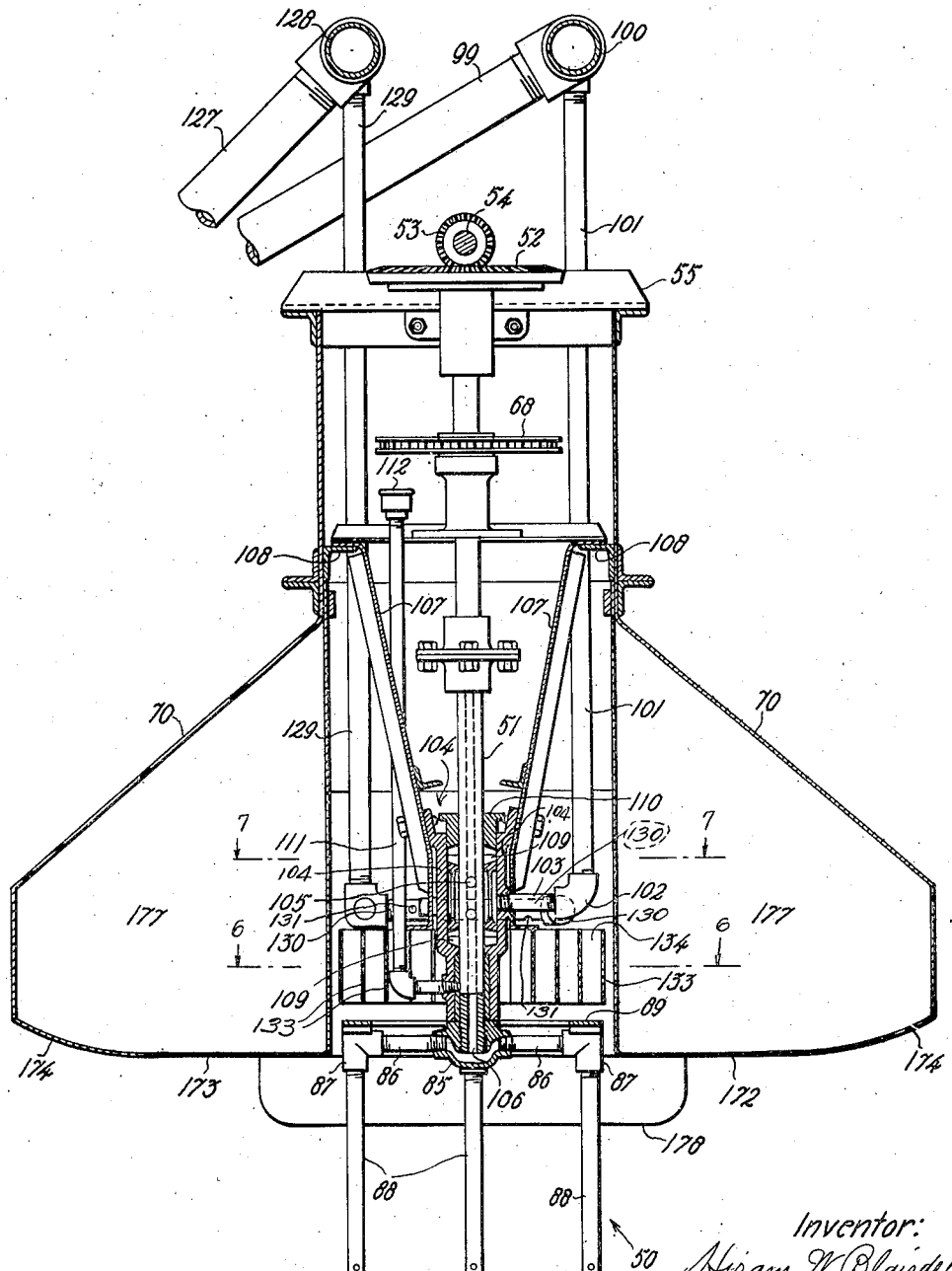

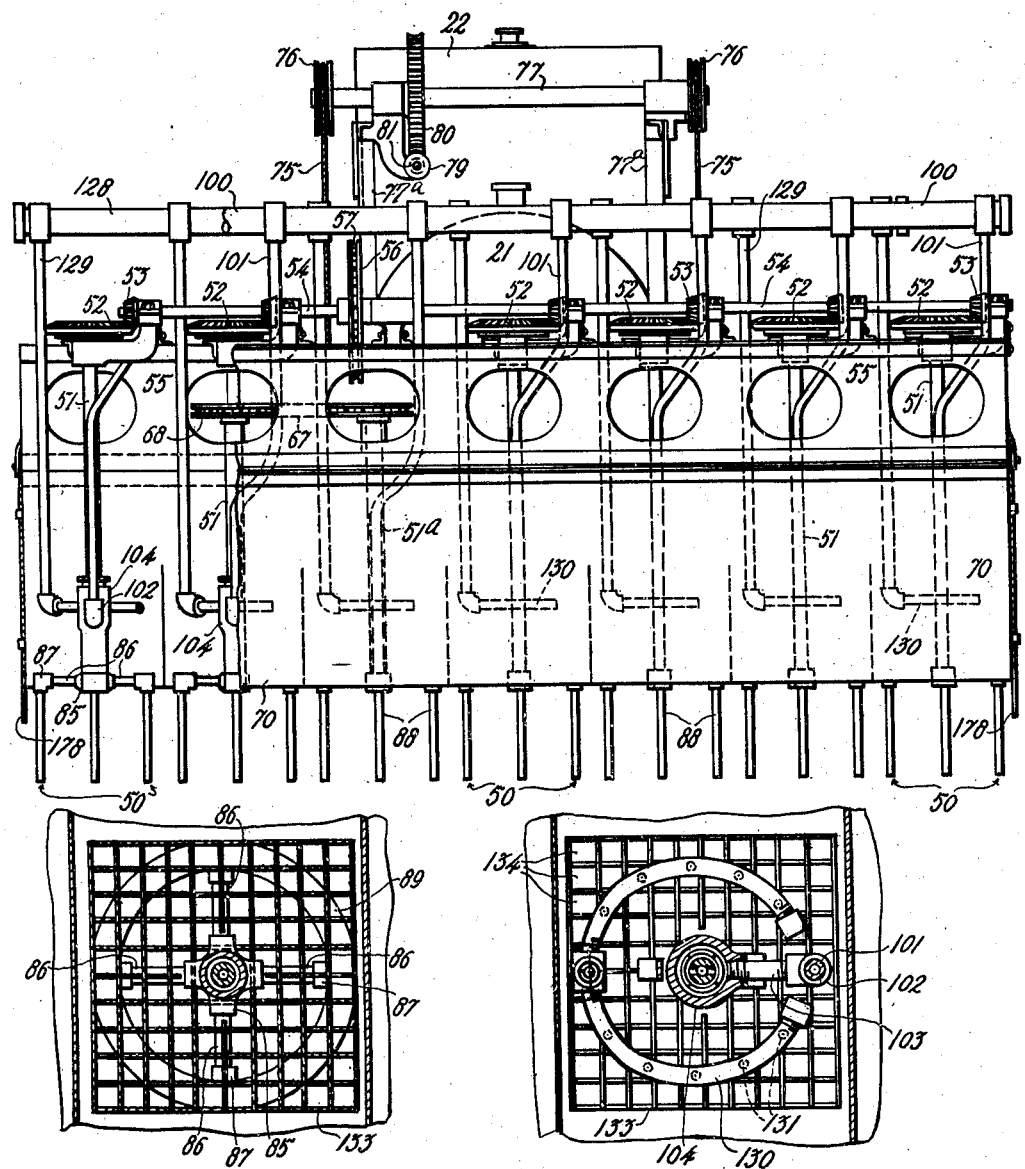

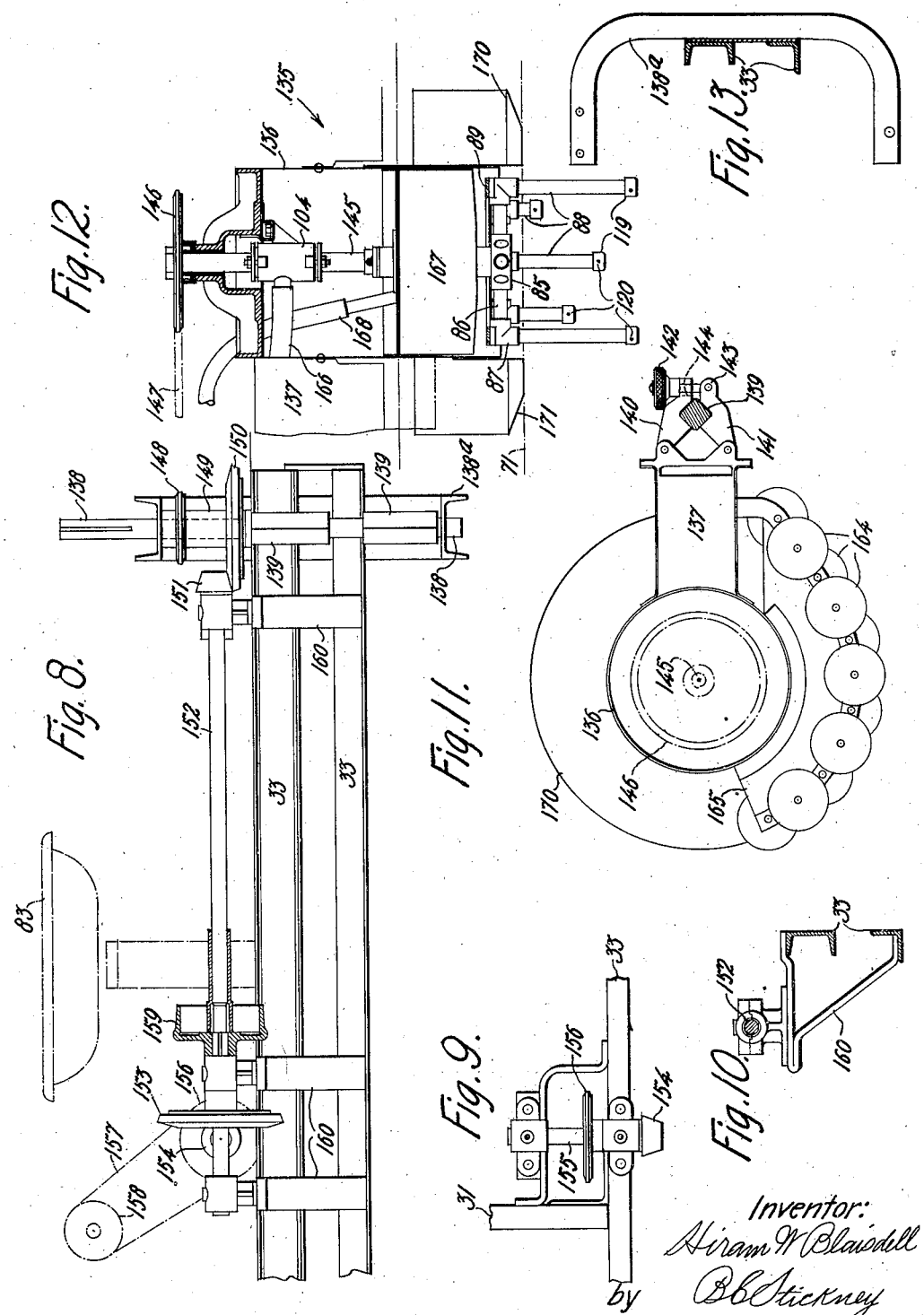

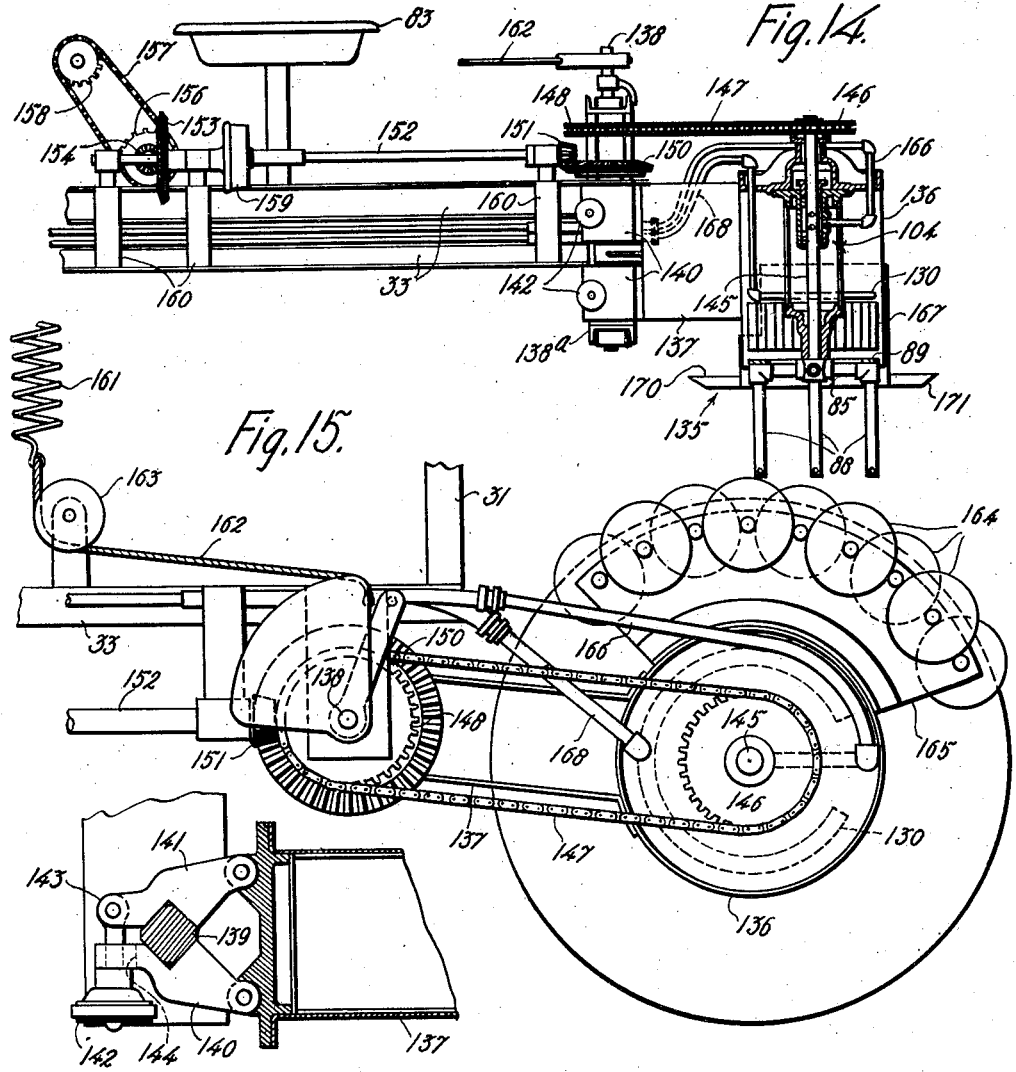

Patented Sept. 16, 1930

1,776,062

UNITED STATES PATENT OFFICE

HIRAM W. BLAISDELL, OF NEW YORK, N. Y., ASSIGNOR TO THE BLAISDELL FILTRATION COMPANY, A CORPORATION OF DELAWARE

FILTER-BED CLEANER

Application filed June 13, 1922, Serial No. 568,087. Renewed February 7, 1930.

This invention relates to machines for cleaning the sand beds of extensive filtration basins for municipalities and other large users.

Heretofore it has been the practice to construct a sand-cleaning apparatus in the form of a crane to span the filter basin, and to run upon tracks provided upon the edge of the basin. This is costly and difficult in transferring from one basin to another; and in freezing weather it is necessary to remove the roof from the basin in order to permit the cleaner to be used.

Moreover, such cleaners are not adapted for use with a filtration basin whose area is so extensive as to make it necessary to support the roof by numerous piers; and in such cases it is the practice to scrape off the mud and sand and transport it to a washing apparatus and then return it to the sand bed, involving great expense and occupying much time during which the filtration basin is kept out of use.

One of the objects of the present invention is to construct a sand cleaner in the form of a tractor sand washer which may be used in many kinds of basins, and which will overcome the objections noted above and others.

To these ends there is employed a cleaning apparatus in a form resembling that of an ordinary tractor of the caterpillar type, in which a tractor belt runs over drive wheels which support the framework of the tractor; auxiliary supporting wheels running upon the belts, and the tractor being motor driven. In its general construction the tractor features may correspond to those of any well-known tractor. The tractor includes the usual means for driving at either one side or the other, or at both sides, according to whether the tractor is to turn to the right or left or go straight ahead or straight back.

Extending across the machine, preferably at the front end thereof, is a row or gang of sand-stirring units, of which seven are shown, although the number may be greater or smaller. Each unit or gang comprises a set of sand-stirring teeth, and all of the units may be revolved simultaneously, thereby stirring up a wide swath of sand. The stirrer teeth project into the filter bed, and are hollow, and supply water to wash the stirred-up sand. In each unit is a suction and settling compartment, to allow the stirred-up sand to settle from the roiled water; and the latter is drawn off by a suction pump. The suction and pressure pumps and the stirring units may be all operated while the tractor is being advanced by its engine.

The stirring gangs are carried upon an elevating frame which is adapted to be hoisted when it is desired to shift the cleaner about, to turn it around, or to transfer it from one basin to another.

One of the features of the novel apparatus is the provision of means upon the tractor belts to prevent them from slipping off from the tractor wheel, and also preferably to give them considerable anchorage in the sand. Each belt is provided with a succession of cross cleats which may be in the form of strips of metal, each strip having at its middle a portion bent inwardly away from the belt to form a retaining tooth, and these teeth entering into openings provided in the rims of the wheels, and lock the belts against lateral slipping. Preferably each wheel is double, or comprises two rims separated by a space, and each belt is double or consists of two belts running side by side and linked together by the toothed cleats, the teeth entering the spaces between the wheel rims.

The stirrer-frame may be partially counter-balanced by means of floats, which may also constitute broad shoes to slide upon the sand bed and afford a support for the stirrer-frame.

Another feature of the improvement resides in providing separate units or stirring gangs swiveled to the rear portion of the tractor to move laterally therefrom on one or both sides, to stir and wash the portions of the sand bed that extend between the usual roof-supporting piers in the filter basin. This unit is adapted to be forced aside or inwardly in passing a pier, but to swing into outward position again after the obstruction is passed.

Other features and advantages will hereinafter appear.

In the accompanying drawings,

Figure 4 is a sectional elevation from front to rear taken through one of the stirring or agitating gangs.

Figure 5 is a front elevation of the apparatus.

Figure 6 is a sectional plan of one of the units as taken on the line 6—6 of Figure 4, showing one form of stirrer-shaft and connections to the stirrer teeth, and also showing a subdivided compartment or honeycomb structure which hastens settling of the sand from the roiled water.

Figure 7 is a sectional view similar to Figure 6 and taken on the section line 7—7 of Figure 4, but taken at a higher elevation, and showing the pipes for supplying wash water and drawing off the roiled water, the latter pipes including a C-shaped collector.

Figure 1:
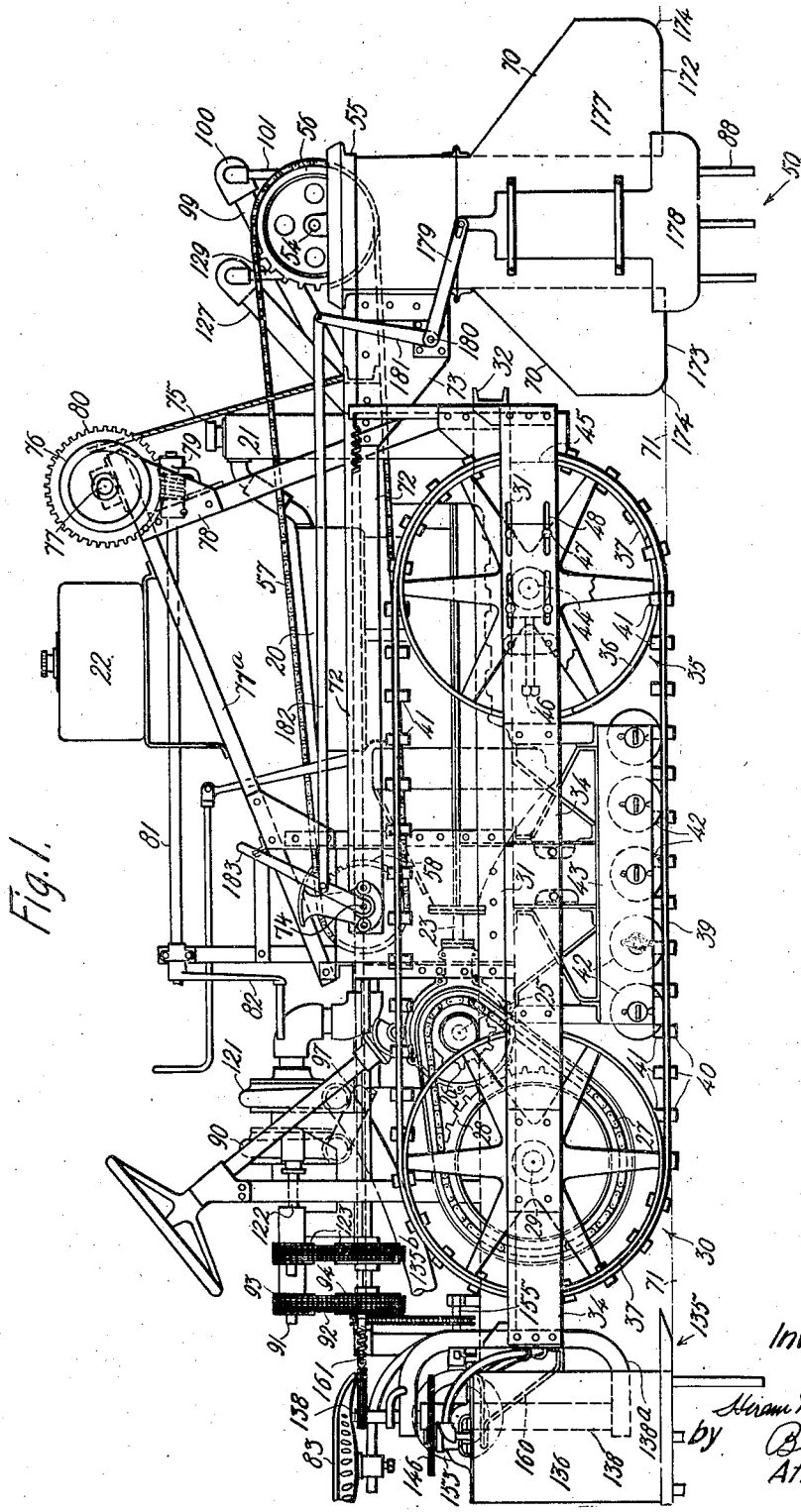
Figure 1 is a side elevation of the present improvements in one form, showing the stirrer-frame down in working position.

Figures 8 to 13, inclusive, show details of the swinging sand-stirring unit or gang at the rear of the apparatus.

Figure 8 is a rear elevation of a portion of the driving mechanism for said unit.

Figure 9 is a plan showing the mounting of a stub-shaft for use in transmitting power to said unit.

Figure 10 illustrates one of the brackets employed in supporting a cross power-shaft for said unit.

Figure 11 is a plan of the unit.

Figure 12 is a diagrammatic sectional elevation of said unit.

Figure 13 is a side elevation of a bracket in which said unit is swiveled, for swinging away from and towards the tractor.

Figure 14 is a sectional rear elevation of the laterally swinging unit and its connection to the tractor.

Figure 15 is a plan of said unit on a larger scale.

Figure 16 is a sectional detail plan of the detachable connection from the unit to the tractor.

The tractor or apparatus preferably comprises a suitable motor for driving it over the filter bed, as well as for operating the sand-stirrers, pumps, etc. This motor may be of the usual type, such as used, for example, on the well-known tractors, and may comprise an engine 20, a radiator 21, a fuel tank 22 and a crank-shaft 23.

This crank-shaft is suitably clutched or connected to transverse horizontal stub-shafts 24, 25. which carry sprocket-pinions 26 to drive chains 27 which run over large sprocket-wheels 28 fixed upon the axles 29 of the rear drive wheels 30 of the tractor. Said drive wheels, sprocket-shafts, and other parts, are mounted upon a framework comprising side bars 31 extending from front to rear and connected at their front and rear ends by cross-bars 32, 33, and also comprising outer side bars 34 to carry the outer ends of the axles of the tractor drive wheels; and said outer side bars 34 may be rigidly connected to said front and rear cross-bars 32, 33.

Each of the four tractor drive wheels 30, 35 comprises a double wheel having two felloes 36, 37, each felloe having a set of spokes, one axle being common to the two sections of each wheel. The felloes in each wheel are spaced apart, and two tractor drive belts 38, 39 extend forwardly from each rear double drive wheel 30 to the double front wheel 35 on each side of the tractor. These belts are firmly connected to each other by numerous closely spaced transverse cleats 40, preferably of steel, each cleat being riveted or otherwise rigidly fixed to each belt, and comprising a projection 41 which extends into the space between the felloes in each wheel, to interlock the belts with the wheel. The projection is preferably made by bending the midway portion of each cleat to form a loop. These cleats hold together the belts in each pair, and also hold the belts in position upon the wheels, inasmuch as some cleats are always positively interlocked with both back and front wheels. The wheels may, therefore, have plain or smooth treads, to run smoothly over the sand bed, while said cleats not only lock the belts in place, but also imbed themselves in the sand and afford an anchorage for the belts, to enable them to drive the tractor.

Between the front and rear wheels on each side of the tractor is a double set of tractor-supporting rollers 42 to run upon each belt, the rollers in each double set being spaced apart axially, to afford a clearance for the projections 41 which rise from the double belt. These rollers one each side of the tractor are journaled in the sides of a frame 43, which is secured to and drops from the side bars 31, 34 of the main frame of the tractor, so that the rollers may afford a partial support for the tractor, and hold the belt to its anchorage in the sand.

To take up slack in the belts, the front double-wheel axles 44 are mounted on brackets 45, which are adjustable forward or back by means of screws 46, and are secured by means of screws 47, which are threaded into the brackets 45 and extend through longitudinal slots 48 in the side frames.

A gang or row of sand-stirrers or agitators, each comprising a set of prongs 50, revolving bodily about vertical axes, and imbedded in the sand, extends across the front of the tractor, and may be rotated rapidly by the engine 20 as the tractor advances slowly. This row of sand-stirrers is of a length about equal to the width of the tractor. The stirrers are placed closely together, to form an efficient sand-cleaning apparatus. There are shown seven of the stirrers 50, although the number may be greater or smaller. Each sand-stirrer unit comprises a main vertical power-shaft 51, driven by means of a bevel-gear 52 upon the upper end thereof, these gears 52 meshing with pinions 53 fixed upon a common horizontal main shaft 54, the latter journaled in the top of the gang stirrer-frame 55, and having a sprocket-wheel 56 connected by a rearwardly-extending chain 57 to a sprocket-wheel 58 mounted at the rear of the engine upon a transverse shaft 59, which, by means of a bevel-gear 60 thereon, meshes with a drive pinion 61 fixed upon a stub-shaft 62, connected by a coupling 63 with a counter-shaft 64, which extends forwardly and rearwardly alongside of the engine, and is connected to the engine crank-shaft 23 by means of a sprocket-wheel 65 on the crank-shaft and a connecting chain 66.

For convenience, one of the vertical stirrer-shafts 51ª, Figure 5, may be driven by a chain 67 from a sprocket-wheel 68 provided upon the next adjacent stirrer-shaft 51. This makes room for the sprocket-wheel 56 which drives the main horizontal power-shaft 54 carried on the stirrer-frame 55.

Said gang or stirrer-frame 55, with a caisson 70 secured thereto and containing all of the stirrer-shafts 51, is hinged to swing up and off from the sand bed 71 far enough to lift all of the stirrer out of the sand. For this purpose the stirrer-frame is carried upon a pair of swing or elevating arm 72, which are secured to the sides of the stirrer-frame by means of brackets 73, and extend backwardly and are hinged at 74 to the main frame at a point in the rear of the engine. This hinge 74 is arranged concentrically with the aforesaid sprocket-wheel 58, shaft 59 and bevel-gear 60, so as to permit the up-and-down swinging of the gang or stirrer-frame independently of the connection between the tractor engine and the stirrers, or while such connection is maintained.

The lifting of the stirrer-frame is effected by means of cables 75 connected to the elevating arms 72 and running up over sheaves 76 carried upon a transverse shaft 77, which is mounted upon and between elevated framings 77ª on the tractor, and is rotated by means of a worm 79 in engagement with a worm-wheel 80 fixed upon said shaft 77; said worm 79 being carried upon a shaft 81 which extends rearwardly and has a crank 82 within convenient reach of the driver's seat 83, provided upon the rear of the tractor. By turning said crank 82, the worm is revolved and the worm-wheel 80 is caused to rotate, together with the sheaves 76, to wind up the cables 75 and lift the stirrer-frame, Figure 2, independently of the engine connections to the stirrers, and whether or not the engine is driving the stirrers.

Since the sand-stirrers may be duplicates, the following detail description applies to each. As seen best at Figure 4, the vertical revolving stirrer-shaft 51 carries at its lower end a hollow head or hub 85 from which radiate short pipes 86, to the outer ends of which are attached elbows 87, and from the elbows drop vertical pipes 88, which revolve in a circular path about the vertical shaft 51, and serve as teeth or tines to stir up the sand. To these elbows 87 may be anchored a common stiffening ring 89 to brace the stirring nozzles or teeth 88.

It will be understood from the foregoing that, when the crank-shaft 23 of the engine revolves, the chain 66 extending from the forward end of the engine causes the counter-shaft 64 to revolve, and its pinion 61 drives the gear 60 on the cross-shaft; while sprocket 58 on the latter operates through chain 57 to drive wheel 56 on the transverse universal stirrer-shaft 54, and its pinions 53 operate through the accompanying gears 52 to drive the vertical shafts 51, each of which, at its lower end, carries the sand-stirring teeth or pipes 88, which are driven bodily around and dislodge or break up the sand as the machine travels over the sand bed.

Figure 3:
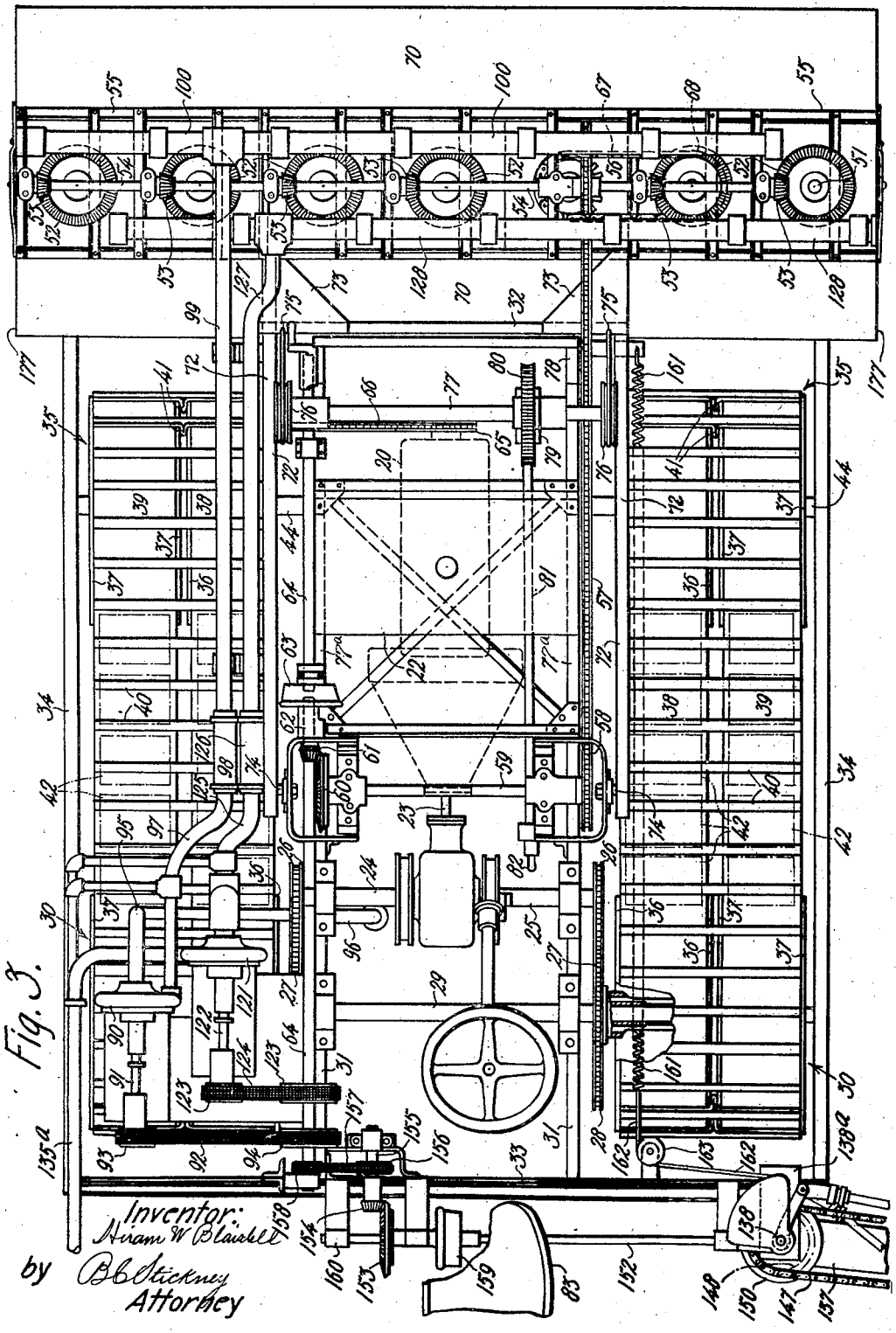
Figure 3 is a plan of the apparatus.

The machine also includes means for washing the sand as it is broken up by the stirrers. This includes a centrifugal force-pump 90, which is operated by a counter-shaft 91 driven by a belt 92 and pulleys 93, 94 from the extended counter-shaft 64. This pump draws water through a pipe 95 which is seen at Figure 3 extending forwardly from the pump 90. Said pipe, after descending, extends at 96 across the machine and may then descend nearly to the level of the sand bed, so as to draw up clear water, which overlies the sand usually to a depth of from four to eight inches. This pump delivers clear water through a flexible coupling 97, to a tubular head 98 fixed on one of the arms 72 of the swing-up stirrer-frame. The point of attachment is close to the axis of the swinging movement, such movement being permitted by the flexible coupling. From the head 98 the water is led through a pipe 99, which extends forwardly along the arm 72 and feeds a transverse distributing header pipe 100 on the stirrer-frame 55. From this transverse header extend downwardly-distributing pipes 101, one for each of the stirrers to convey clear water to the stirring nozzles 88.

Each of these distributing pipes 101 at its lower end, is connected by an elbow 102 and pipe 103 to a chambered bearing 104, in which revolves the lower end portion of the stirrer-shaft 51. Within the chambered portion of this bearing 104 said shaft 51 has inlet perforations 105; and below these perforations the shaft 51 is a tubular or hollow as at 106, so that water feeding down through the distributing pipe 101 and flowing into the chambered bearing 104 is led down through the hollow shaft 51 or 106, and thence flows into the chambered hub 85 and out through the radiating pipes 86, and down to the stirrers 88, to be discharged at the open bottoms thereof, for washing the sand as it is being stirred up mechanically by the revolution of the pipes 88. The chambered bearing 104 may be rigidly supported by arms 107, which converge inwardly and downwardly from horizontal bars 108 extending along the general stirrer-head and forming part of the framework thereof. Suitable packing 109 is provided around this shaft above and below the water chamber; this packing being tightened by a gland-nut 110. Suitable lubricating fluid may be led to the lower part of the shaft 51 through a piping 111 having a suitable cap 112.

From the foregoing, it will be seen that clear water drawn up by the pump 90 from the filter basin is forced through the flexible coupling 97, head 98 and the forwardly-extending pipe 99 to the cross-header pipe 100, and thence down through all of the distributing pipes 101 to the several chambered bearings 104, by which the water is delivered to the hollow stirrer-shafts 51 and led down to the stirrers 88 and discharged therefrom, to wash the loosened sand.

Figure 2:
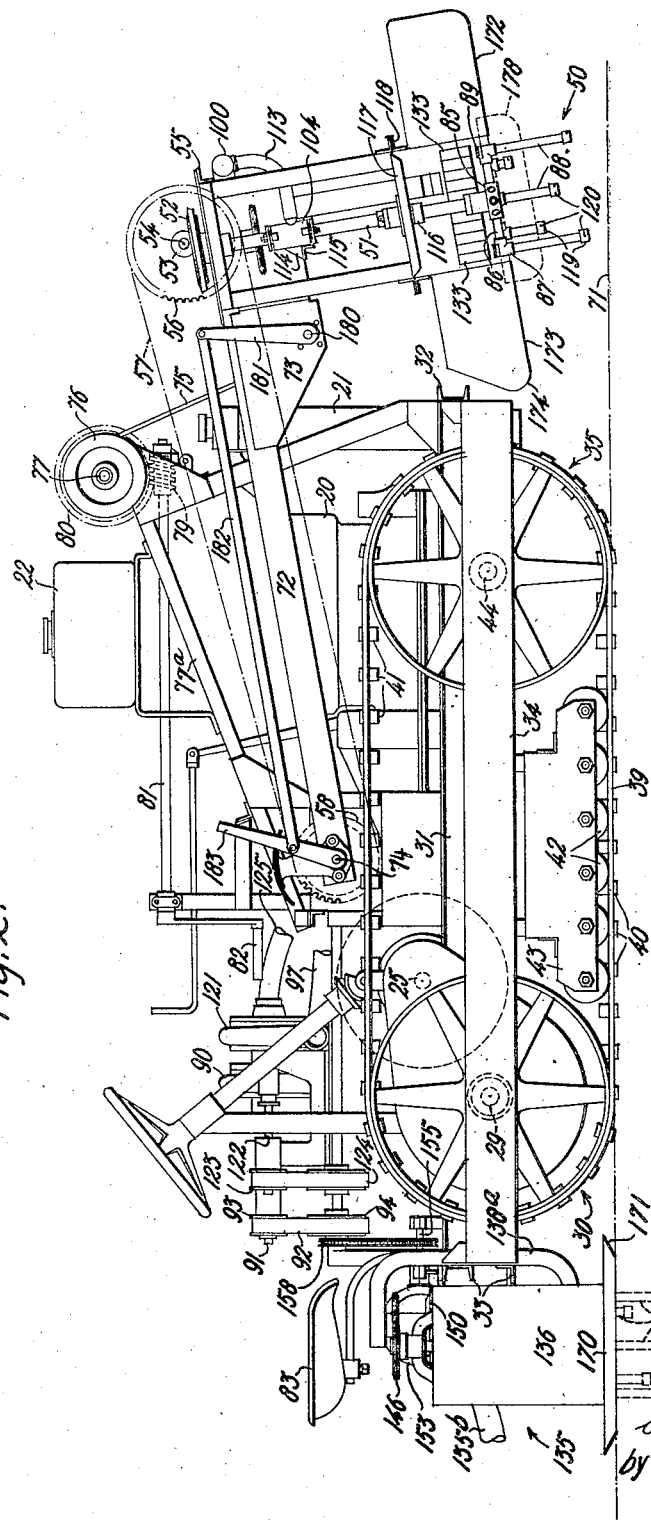
Figure 2 is a view of the general structure similar to that at Figure 1, and showing how the stirring gang is elevated at an angle to the horizontal which is another one of my improvements because it renders more accessible the stirring heads for replacement or repair.

In Figure 2 is shown a preferred form of stirrers and appurtenances. The chambered bearing 104 is located near the top of the shaft 51, and is connected by a short elbow-pipe 113 to the distributing header 100, this connection 113 being preferably a flexible hose. These chambered bearings may be formed with lugs 114, whereby they may be attached to a portion of the stirrer framework, consisting of an angle-iron 115 extending the length of the framework.

Near its lower portion, the shaft 51 may revolve in a bearing 116 fixed upon one of a series of cross-bars 117, which, at their ends, are attached to angle-irons 118 forming portions of the general stirrer framework. The shaft 51 is thus well supported; moreover, sufficient clearance is secured in the lower portion of the caisson and in the cellular settler hereinafter described.

At Figure 2 it will also be seen that the sand-stirring hollow teeth 88 are of graduated lengths, and may be eight in number, in place of the four seen in the other views. The graduating of the lengths of these stirrers makes them more efficient in proportion to the power required to operate them, since the shorter ones have lessened work to do, while the deep sand is sufficiently broken up by the few longer stirrers.

At Figure 2 the bottom of each hollow stirrer or pipe 88 is closed by a cap 119, and in the side of the cap is formed an orifice 120 through which the water is discharged with substantial force, the jet preferably discharging in the direction in which the stirrer is advancing.

As the sand is loosened, it is washed partly by the clear water lying upon the bed, and partly by the water ejected under pressure from the stirrers. It is desired to eliminate this roiled water from the filter basin, and for this purpose there is employed a suction pump 121 mounted upon the main frame of the machine and having a shaft 122, Figure 3, which is connected by pulleys 123 and belt 124 to the aforesaid counter-shaft 64, to be driven thereby. At the intake end of the pump, there is a short flexible coupling 125 attached to a tubular head 126 anchored on one of the swing arms 72; and from this support a pipe 127 leads forwardly to a second transverse header suction pipe 128 provided upon the gang-frame. From this transverse header pipe 128 suction pipes 129 descend within the caisson and terminate at their lower ends in annular or C-shaped suction tubes 130 having perforations 131 in their under sides, for the intake of the roiled water; one of these C-shaped tubes surrounding each of the stirrer-shafts 51.

Just beneath the perforations 131 in the suction tubes 130 in the caisson are placed cellular or honeycomb frames or chambers 133, one for each stirrer-shaft 51; this frame at Figure 7 surrounding the chambered bearing 104 and comprising many short tubes or cells 134 open both top and bottom and serving to settle the fine sand contained in the roiled water, or at least to retard whirling motion or rotation of the body of roiled water as it rises above the stirrers. It is not desired to draw the sand off with the roiled water, but rather to allow it to settle and redeposit upon the filter bed, and this honeycomb structure or subdivided compartment tends to favor such settling of the sand; the roiled water rising up slowly therethrough, and the water in each cell becoming quiescent and hastening the descent of the sand to settle it upon the filter bed before reaching the perforated suction tube 130.

The dirty water drawn up and discharged by the suction pump 121 is led off through a pipe 135$^a$, Figure 3, and a hose 135$^b$, which may lead to a waste-water trough provided in the side of the filter basin, or to any other point where it is desired to dispose of the wash water.

A washing unit 135, which swings laterally preferably from the rear portion of the tractor, will now be described. One of these washers may be mounted at each side of the tractor, but description of one will suffice for both.

The frame for this washer comprises a vertical tube or shell 136 having an arm 137 which is secured to a vertical rock-shaft or trunnion-shaft 138, which is journaled at its top and bottom ends in a bracket 138ª that is secured to the rear cross-bars 33 of the main frame of the tractor; said shaft having upper and lower squared portions 139 upon which sets of opposite jaws 140, 141 are clamped, each set by one or more hand screws 142, each screw being swiveled on one jaw at 143 and passing through an open slot 144 in the other jaw, so as to be readily cast off when it is desired to unship the washer and withdraw it from the sand, preparatory to turning the tractor, or driving it to another filter basin, or to another portion of the same basin.

Downwardly from casing 136, which constitutes a caisson, extend sand-stirring and washing pipes 88 of various lengths, corresponding to those already described; and these are mounted upon a vertical shaft 145 corresponding to the shaft 51 already described, and extending up to the top of the caisson 136, and carrying at its top a sprocket-wheel 146, from which extends a drive chain 147 to a sprocket-wheel 148 carried upon a loose sleeve 149 mounted upon or concentrically with the trunnion-shaft 138, so that driving connection is maintained with the stirrer-shaft 145 in all positions to which the stirrer unit may swing upon said trunnion-shaft 138.

Upon the same sleeve 149 as the sprocket-wheel 148 is a bevel-gear 150, which is operated by a drive pinion 151, upon the end of a transverse shaft 152, said shaft also carrying a large bevel-gear 153, which meshes with a drive pinion 154 upon a stub-shaft 155, the latter having a sprocket-wheel 156 connected by a chain 157 to a driving pinion 158 on the aforesaid counter-shaft 64, which is driven by chain 66 from the crank-shaft of the engine. A clutch 159 may connect sections of the cross-shaft 152, so that the engine may continue in motion while the stirrer teeth 88 are stationary.

It will thus be seen that power from the counter-shaft 64 is transmitted through the sprocket-chain 157 to the stub-shaft 155, and that the latter, by means of its pinion 154, drives the bevel-gear 153 and the cross-shaft 152, while the drive pinion 151 on the end of the latter drives the bevel-gear 150 on the vertical hollow shaft or sleeve 149, regardless of the position to which said vertical shaft may swing, so that in all positions of the washer 135 the stirrer-shaft 145 is revolved by means of the sprocket 148, chain 147 and pinion 146. The sections of the cross-shaft 152 may be supported upon brackets 160, which are attached to the rear cross-bars 33 of the tractor frame.

Preferably, a spring 161, Figure 3, is provided, connected at its front end to the forward portion of the tractor frame, and connected at its rear end by means of a cord 162 and pulley 163 to the swinging stirrer unit 135, and tending always to swing said unit outwardly or away from the tractor, and also holding it evenly to its work of cutting its way through the sand. If any obstacle is met, such as a pier rising from the sand, or an obstruction imbedded in the sand, the washer will swing past the obstacle, the spring yielding to permit such movement; and, after the obstacle is passed, the spring will return the unit to the proper working position.

Preferably this washer 135 has a series of buffer wheels 164 arranged substantially in an arc around one side of the stirrer-frame 136, for engagement with the piers, to reduce the shock when the pier is struck, and ease the movement of the tractor past the pier. These buffer wheels may be secured upon a segmental bracket 165 attached to the stirrer unit frame or shell 136.

Water may be supplied to the chambered bearing 104 of the stirrer-shaft 145 in this washer in the same manner as in the front washers 50, a pipe 166 extending from the force-pump 90, and connected to said chambered bearing, said pipe being flexible to accommodate the independent movements of the washer, and being also detachable from the chambered bearing, so as to permit the unit 135 to be taken off from the tractor. The trailing washer 135 may also be provided with the other appurtenances, including a honeycomb settling chamber 167 and a pipe 168 to draw off the dirty roiled water, said pipe 168 being detachable and flexible and connected to the suction pump 121.

The trailing washer 135 may be provided with a shoe, in the form of a broad flat, sheet-metal ring 170, surrounding the caisson 136 and resting upon the sand; the border of the disk being flared upwardly at 171 for riding over the sand. The shaft 138 is journaled with end play in the bracket 138ª, so as to accommodate the up-and-down movements of the sand-stirring unit 135 as it rides over an unevenness in the sand bed.

The trailing filter bed washer 135 is adapted to swing out and work in and around corners and pillars of a filter bed which cannot conveniently be reached by the stationary forward washers 50. When not in use, the trailing washer 135 is readily detached from the tractor as already mentioned by unloosening the hand wheel 142 as shown in Figure 11. The bumper rollers 164 protect the caisson from damage by bumping into the walls or pillars of the filter beds and enables the operator to drive the swinging washer caisson right up against the walls or pillars.

The washer gang frame 55 at the front of the machine is also provided with shoes, one of them (172) at the front of the frame and one (173) at the rear thereof; the shoes having upwardly-curved front and rear tips 174 to facilitate riding over uneven places in the sand. For counterbalancing the weight of the stirrer-frame, there may be provided floats or buoyancy-chambers, of which said shoes form the bottoms. The front and rear walls 70 of the caissons form the sides of the floats; the remaining sides and top being designated as 70 and the ends as 177. The tops preferably slope away from the stirrer-frame, and these floats may be so proportioned as to be efficient aids in supporting the stirrer-frame. The floats extend the entire length of the frame 55 and preferably somewhat beyond the sides of the tractor, as seen at Figure 3. These floats may rest upon the sand bed and prevent the stirrers from penetrating too deeply into the bed, and, by reason of their great area, may afford such support as to slip readily along the filter bed.

As an aid in breaking up the sand bed preparatory to its loosening by the stirrers, there may be employed vertical cutter blades 178 extending fore and aft, one at each end of the caisson, these cutters being pivoted to arms 179 extending forwardly from a rock-shaft 180 carried upon the stirrer-frame, said shaft having an upstanding arm 181 which is connected by a link 182 to a lever 183, so that, by pushing the lever and link forwardly, the rock-shaft 180 is rotated and the cutters are sunken in the sand, from which they may be withdrawn by a reverse movement of the lever 183.

In operation, the front sand washers 50 are lowered into the filter bed by operation of the crank 82. The stirring nozzle teeth 88 rotate in the filter bed as the tractor slowly moves forward. The pump 90 draws up clear water from the filter bed remotely from the washers 50 so that clear water is forced through the header pipe 100 down through the many revolving nozzles 88. The water being ejected from the lower ends of the nozzles 88, rises through the interstices of the filter bed thereby dislodging and carrying upwardly the dirt and sediment to be removed. The dirty water bearing the sediment and foreign particles to be removed from the filter rises into the cellular settling chamber 134 which acts to stop the boiling and swirling agitation of the water thereby permitting the clean filter sand and gravel to settle while the dirty water continues to carry the sediment and impurities in suspension.

The suction pipes 130 placed just above the settling cells 134 suck up the dirty water as it rises above the top edge of settling chamber 134 and thereafter conveys the dirty water and sediment away from the machine and out to a waste discharge beyond the filter bed being cleaned, the suction header pipe 128 connected with the suction pump 121 operating for this purpose. The cellular settling chamber 134 is disposed between the sand agitating water discharge nozzles 88 and the suction dirty water removing member 130 so that all breaking up and dislodging of the silt and sediment occurs under the cells 134 while all removal of the dirty water occurs above the cells. By this arrangement of structure and mode of operation, the sand, gravel and filter material is caused to gravitate back to the filter bed and is therefore not drawn up into the suction pipes.

The hollow sand-washing teeth 88 are perforated to eject water under good pressure into the filter sand under water as already explained to wash the filter sand in place without draining the water from the filter bed. The teeth 88 are raised and lowered or tilted up and down at an angle about the horizontal axis 74 by operation of the lever or crank means 82 and cables 75 heretofore explained, and hence the teeth undergo an angular movement in relation to the horizontal in an up and down manner, to move or swing the teeth into and out of working relation under the sand. By tilting the teeth 88 carried in the washing caisson 70 upwardly at an angle out of the filter-sand bed about the horizontal pivot 74, it follows that the tractor may be driven under its own power or motor means up a ramp usually provided for getting the tractor vehicle in and out of the filter bed.

Variations may be resorted to within the scope of the invention, and portions of the improvements may be used without others.

Having thus described my invention, I claim:

1. A sand-cleaning apparatus comprising a tractor to run about upon a filtration bed, a float and means to raise and lower it, a series of individually revoluble sand-stirring units carried with the float and raised and lowered with it, each unit containing a set of teeth, and power-driven means for revolving all of the units simultaneously while the tractor is traveling; a sand-settling compartment being provided for each of said units, and means carried on the tractor for drawing off the water from said settling compartments.

2. A sand-cleaning apparatus comprising numerous sand-stirrers and a tractor on which said stirrers are carried, said tractor adapted to move about upon the filtration bed, power-driven means for operating the sand-stirrers while the tractor is traveling, a frame on said tractor upon which said stirrers are mounted, means upon said tractor for hoisting said frame to lift the stirrers out of the sand, and floats upon said stirrer frame for partially counterbalancing the same, said floats having broad bottoms constituting shoes to travel upon the sand.

3. A sand-cleaning apparatus comprising a tractor to run about upon a filtration bed, a row of sand-stirring units mounted upon said tractor, each unit containing a set of prongs and revoluble individually, each unit also comprising a drive-shaft, and a main shaft geared to all of the drive-shafts, a frame upon which said units and said gearing are carried, means for raising said frame, a motor upon the tractor, and a connection from said motor to drive said main shaft in all positions of the stirrer-frame.

4. A sand-cleaning apparatus comprising a tractor to run about upon a filtration bed, a row of sand-stirring units mounted upon said tractor, each unit comprising a set of prongs and revoluble individually, each unit also comprising a drive-shaft, and a main shaft geared to all of the drive-shafts, said main shaft having a sprocket-wheel, a chain connecting said sprocket-wheel to a second sprocket-wheel carried upon the tractor, said units carried upon a frame which is hinged to swing up and down on said tractor about a point which is about concentric with the second sprocket-wheel, a counter-shaft extending forwardly and rearwardly alongside of the driving motor of the tractor, and a driving connection between said counter-shaft and said second sprocket-wheel.

5. A sand-cleaning apparatus comprising a tractor having an engine, a stirrer-frame hinged upon the tractor, means to raise the stirrer-frame upon its hinge, said stirrer-frame comprising movable stirrers, a shaft extending across said stirrer-frame for operating the stirrers, and driving connections from said shaft to the tractor engine, said connections comprising a wheel mounted upon the tractor about concentrically with the hinge of said stirrer-frame; connection being maintained between the engine and the stirrers while the stirrer-frame is raised and lowered.

6. A sand-cleaning apparatus comprising a tractor to run about upon a filtration bed, a frame mounted for up-and-down movement on said tractor, a caisson carried by said frame, a row of stirrer units in said caisson, means extending from the tractor to said stirrer units to revolve the same, cables connected to said stirrer-frame, sheaves upon the tractor to which the cables run, and a worm-gear to operate the sheaves.

7. A sand-cleaning apparatus comprising a tractor to run about upon a filtration bed, a frame mounted for up-and-down movement on said tractor, a caisson carried by said frame, a row of stirrer units in said caisson, means extending from the tractor to said stirrer units to revolve the same, said stirrers comprising hollow sand-stirring teeth, a pump upon said tractor, means connecting said pump to all of said stirrers to force water therethrough into the sand, and means connecting said pump to the tractor engine to operate the pump during the travel of the tractor and the revolution of the sand-stirrers.

8. The combination with a sand-stirring unit and means for revolving the same and for supplying water therethrough to wash the sand, of a cellular or sub-divided compartment open at the top and bottom above the stirrers to prevent the rotation of the roiled water and thereby permit the sand to settle, and means for drawing off the roiled water from said subdivided compartment.

9. A sand-cleaning apparatus to travel about upon a filter bed, comprising a tractor, sand-stirring and washing units mounted thereon, one of said units being swiveled to the tractor to swing laterally therefrom.

10. A sand-cleaning apparatus to travel about upon a filter bed, comprising a tractor having sand-stirring and washing units, one of said units being swiveled to the tractor to swing laterally therefrom, and a spring tending to swing said unit away from the tractor.

11. A sand-cleaning apparatus to travel about upon a filter bed, comprising a tractor having sand-stirring and washing units, one of said units being swiveled to the tractor to swing laterally therefrom, said swinging unit being detachably mounted upon said tractor.

12. A cleaner in the form of a tractor to run about upon a filtration bed, and having a laterally-movable sand-stirring unit which is hinged or journaled to the tractor to swing laterally therefrom, said tractor having a vertical shaft to which said unit is detachably secured, and driving means extending from the tractor to said unit and including a wheel concentric with said vertical shaft.

13. A cleaner in the form of a tractor to run about upon a filtration bed, and having a laterally-movable sand-stirring unit which is hinged or journaled to the tractor to swing laterally therefrom, said tractor having a vertical shaft to which said unit is detachably secured, and driving means extending from the tractor to said unit and including a wheel concentric with said vertical shaft, said vertical shaft including squared portions upon which are clamped jaws provided upon said unit.

14. A cleaner in the form of a tractor to run about upon a filtration bed, and having a laterally-movable sand-stirring unit which is hinged or journaled to the tractor to swing laterally therefrom, said unit comprising a tubular frame constituting a caisson, and having sand-stirring teeth extending downwardly from said caisson, and comprising a vertical drive-shaft extending up through said caisson, a sprocket-wheel on said vertical shaft, a drive-chain extending from said sprocket-wheel to a second sprocket-wheel mounted concentrically to the hinge and loosely mounted, and connections from the tractor to said second sprocket-wheel.

15. A cleaner in the form of a tractor to run about upon a filtration bed, and having a laterally-movable sand-stirring unit which is hinged or journaled to the tractor to swing laterally therefrom, said unit comprising a tubular frame constituting a caisson, and having sand-stirring teeth extending downwardly from said caisson, and comprising a vertical drive-shaft extending up through said caisson, a sprocket-wheel on said vertical shaft, a drive-chain extending from said sprocket-wheel to a second sprocket-wheel mounted concentrically to the hinge and loosely mounted, and connections from the tractor to said second sprocket-wheel, a clutch being provided in the connections between the tractor motor and said sand-stirring teeth.

16. A cleaner in the form of a tractor to run about upon a filtration bed, and having a laterally-movable sand-stirring unit which is hinged or journaled to the tractor to swing laterally therefrom, said unit provided with a series of buffer-wheels at the outer side thereof to reduce the shock when an obstacle is struck during the advance of the tractor.

17. A cleaner in the form of a tractor to run about upon a filtration bed, and having a laterally-movable sand-stirring unit which is hinged or journaled to the tractor to swing laterally therefrom, a pump upon said tractor, and a flexible connection between said pump and said unit to supply water through the unit to wash the sand, and means rendering said connection detachable so as to permit the unit to be unshipped.

18. A cleaner in the form of a tractor to run about upon a filtration bed, a laterally-movable sand-stirring unit hinged to the tractor to swing laterally therefrom, and a shoe in the form of a broad flat ring flared upwardly around its outer border carried on the cleaner.

19. A sand-cleaning apparatus comprising numerous sand-stirrers and a tractor on which said stirrers are carried, said tractor adapted to move about upon the filtration bed, power-driven means for operating the sand-stirrers while the tractor is traveling, a frame on said tractor upon which said stirrers are mounted, means upon said tractor for hoisting said frame to lift the stirrers out of the sand, and floats provided upon said frame for partially counterbalancing the weight thereof.

20. A sand-cleaning apparatus comprising numerous sand-stirrers and a tractor on which said stirrers are carried, said tractor adapted to move about upon the filtration bed, power-driven means for operating the sand-stirrers while the tractor is traveling, a frame on said tractor upon which said stirrers are mounted, means upon said tractor for hoisting said frame to lift the stirrers out of the sand, and floats provided upon said frame for partially counterbalancing the weight thereof, said floats having bottoms which constitute shoes to support the stirrer-frame upon the sand.

21. A filter bed washer comprising in combination, a sand stirring agitator, water pressure feed means cooperating with the agitator to wash silt out of the agitated sand, suction means to carry off the silt and water, a sand settling out device including means to stop the whirl of the water disposed between the agitator and suction means, and driving means to operate the washer.

22. A filter bed washer comprising in combination, a sand stirring agitator, water pressure feed means cooperating with the agitator to loosen the sand and wash silt out of the agitated sand, suction means to carry off the silt and water, a settling chamber disposed between the agitator and water feed means, a plurality of vertically disposed closely spaced cells embodied within the settling chamber, and driving means to operate the washer.

23. A filter bed washer comprising in combination, a cellular settling chamber, stirring nozzles revolving directly beneath the cellular chamber and adapted to agitate the filter bed, means to force water through the nozzle to carry the silt and sand up into the cellular settling chamber, suction means adapted to carry off the dirty water and silt rising above the cellular settling chamber, and power means to operate the washer.

24. A filter bed washer comprising in combination, stirring nozzles adapted to rotate in the sand of the filter bed, pressure feed means discharging clear water through the lower ends of the nozzles thereby washing sand and silt and dirt upwardly out of the bed; a cellular chamber placed above and adjacent the stirring nozzles and adapted to receive the rising sand, silt, dirt and water; perforated suction intake pipes disposed above and adjacent the cellular chamber to carry away the dirty water and silt, since the sand aforesaid gravitates back to the bed through the cellular chamber; and power means to operate the washer.

25. A filter bed washer comprising in combination, a float adapted to slide along the filter bed, said float made with a central caisson therethrough, a hollow water feed drive shaft carried in the caisson, sand agitating water ejecting nozzles carried on the lower end of the shaft to stir sand and wash silt upwardly therefrom into the caisson, a honeycombed open top and open bottom chamber disposed in the caisson above the nozzles upwardly through which dirty water flows and downwardly through which sand settles, suction intake pipes mounted in the caisson above and adjacent the honeycombed chamber to carry off the dirty water, and power means to operate the washer.

26. A filter bed washer comprising in combination, a caisson adapted to rest on the sand bed surface of the filter bed, water ejecting stirring nozzles projecting below the caisson into the sand and rotating therein washing upwardly said silt and dirty water in a whirling motion, means mounted in the caisson adjacent the nozzles to receive the whirling dirty water and sand and stop the whirling motion thereof causing the dirty water to rise vertically therethrough and permitting the sand to settle, a hollow drive shaft mounted in the caisson extending through the means and anchored to the nozzles, a chambered bearing mounted in the caisson and supporting the hollow shaft and opening into the hollow shaft, means feeding water under pressure to the chambered bearing and thence to the nozzles, water and silt suction apparatus cooperating with the means to draw off the dirty water from the means, and power means to operate the washer.

27. A filter bed washer comprising in combination, a tractor adapted to propel the washer along the filter sand bed, a gang frame mounted on the tractor, a caisson depending from the frame and resting on the filter bed, a gang of water ejecting stirring nozzles mounted in the caisson, a plurality of open top and bottom honeycombed settling chambers one each placed adjacent and above each of the gang of nozzles, and a plurality of perforated intake suction coils placed adjacent and above each gang of nozzles.

28. A filter bed cleaner comprising in combination, a tractor, a stirring gang frame mounted thereon, a pair of spaced elevating arms pivoted at one end on the tractor and reaching beyond the end of the tractor and having their other ends anchored to the gang frame, a gang of sand stirring washers carried by the gang frame and adapted to be swung upwardly out of the sand at an angle to the horizontal by the elevating arms, and means for raising and lowering the elevating arms.

29. A filter bed cleaner comprising in combination, a tractor, a stirring gang frame mounted thereon, a pair of spaced elevating arms pivoted at one end on the tractor and reaching beyond the end of the tractor and having their other ends anchored to the gang frame, a gang of sand stirring washers carried by the gang frame and adapted to be swung upwardly out of the sand at an angle to the horizontal by the elevating arms, a rigid frame carried on the tractor rising above the elevating arms, elevating mechanism carried on the frame, a pull cable extending therefrom to the arms, a manual operating device connected with the mechanism by which the cable is wound in or out.

30. A filter bed cleaner comprising in combination, a tractor, a stirring gang frame movable carried beyond one end of the tractor, a caisson carried thereunder, sand bed washing agitators mounted in the caisson, elevating arms extending parallel with the tractor reaching therebeyond and having one end thereof anchored to the gang frame, fulcrum means pivotally connecting the other ends of the arms on the tractor at a point back from the frame, and elevating mechanism carried on the tractor connected with the frame and arms by which the caisson and washing agitators are raised on an arc described from the aforesaid fulcrum means.

31. A filter bed cleaner comprising in combination, a tractor, a stirring gang frame movably carried beyond one end of the tractor, a caisson carried thereunder, a blade mounted at each end of the caisson to cut a swath of sand to be washed, means mounting the blades on the caisson permitting said blades to slide up and down, sand bed washing agitators mounted in the caisson, elevating arms extending parallel with the tractor reaching therebeyond and having one end thereof anchored to the gang frame, fulcrum means pivotally connecting the other ends of the arms on the tractor at a point back from the frame, a lever pivotally mounted on the fulcrum means, a connection extending along the elevating arms from the lever to the blades by which the blades are raised and lowered into and from the sand, and elevating mechanism carried on the tractor connected with the frame and arms by which the caisson and washing agitators are raised on an arc described from the aforesaid fulcrum means.

32. A filter bed washer comprising in combination, a tractor, a rigid frame carried thereon and rising above the tractor, elevating mechanism carried on the frame above the tractor, a caisson and gang of sand agitating washers placed at one end of the tractor, cables operating off of the elevating mechanism and connected with the caisson and washers, and reach arms fulcrumed at one end thereof on the tractor and rigidly connected at their other ends to the caisson and washers by which the caisson and washers are held in spaced relation from the end of the tractor.

33. A filter bed washer comprising in combination, a tractor, a rigid frame carried thereon and rising above the tractor elevating mechanism carried on the frame above the tractor, a caisson and gang of sand agitating washers placed at one end of the tractor, cables operating off of the elevating mechanism and connected with the caisson and washers, a bell crank pivotally carried on the caisson washer, a sand cutting blade slidably mounted on each end of the caisson washer and connected to the bell crank, and means to operate the bell crank to raise and lower the blades.

34. A filter bed washer comprising in combination, a tractor machine, a horizontal arm pivoted at one end on the tractor, a caisson anchored at the other end thereof and adapted to swing away from the tractor and reach inaccessible parts of the filter bed, a sand stirring water ejecting nozzle head mounted within the caisson, driving means to rotate the nozzle head, and means detachably connecting the arm to the tractor.

35. A filter bed washer comprising in combination, a tractor machine, a horizontal arm pivoted at one end on the tractor, a caisson anchored at the other end thereof and adapted to swing away from the tractor and reach inaccessible parts of the filter bed, a sand stirring water ejecting nozzle head mounted within the caisson, a protective bumper secured to the caisson by which the washer is enabled to work up close to filter bed obstructions without damage thereto, and power means to operate the washer.

36. A filter bed washer comprising in combination, a tractor, a gang of sand agitating water ejecting nozzle washers mounted on one end of the tractor adapted to wash a straight swath of sand as the machine advances, a trailing sand washer at the other end of the tractor adapted to reach out and wash places in the filter bed not reached by the first named washers, a horizontal arm pivoted on the tractor and anchored to the trailing sand washer, and means detachably mounting the arm on the tractor.

37. A tractor sand washer comprising; a belt-tread machine, motor means carried thereon, and a transmission drive from the motor to the belt-tread to propel the washer over the sand in the water, lifting mechanism carried with the washer and means for raising and lowering the same; a float attached to the lifting mechanism, and stirring teeth and means mounting the same on the float to raise and lower the teeth with the float; driving means to operate the teeth; and suction means to draw off the muddied water above the stirring teeth.

38. A filter-said washer comprising a tractor-type vehicle with belt-tread means to travel on the sand under water, motor means to drive the belt tread and propel the washer thru the water over the sand, perforated hollow sand-washing teeth carried by the tractor washer and adapted to be pushed thru the filter sand, water-supply means connected with the hollow teeth and adapted to force water under pressure out thru the perforated teeth to wash the filter sand in place under water as the vehicle travels over the filter bed, and means including a horizontal axis to pivotally mount the sand-washing teeth on the vehicle whereby said teeth may be tilted into and out of the sand at an angle in relation to the horizontal.

39. A filter-sand washer comprisng a tractor frame, wheels and belt-tread means, and motor means to drive the washer thru water on the surface of a filter bed, a washing caisson disposed at one end of the tractor frame, perforated hollow sand-washing teeth mounted in and carried by the caisson, means to tilt the teeth down and up at an angle in and out of the sand, and a force-feed water-supply means connected with the teeth to eject water under the sand to wash it as the teeth are plowed thru the sand.

40. A tractor sand washer, motor means to drive it thru water upon the surface of a filter-sand bed, teeth carried by the tractor and being hollow and perforated and adapted to be forced along under the sand by the motor means driving the tractor, pivotal-support means movably mounting the teeth on the tractor whereby the teeth may have their lower ends tilted upwardly at an angle from out of the sand bed and tilted reversely at an angle down into the sand bed, a washing caisson within and on which the teeth are carried, water feed means leading to the teeth and ejecting water under pressure thru the perforated teeth into the sand, water suction means connected to the washing caisson above the tiltable teeth to carry off the dirty water arising from the sand washing operation within the washing caisson, and pulley and cable means on the tractor above the washing caisson to raise and lower it.

41. A tractor sand washer, motor means to drive it thru water upon the surface of a filter-sand bed, teeth carried by the tractor and being hollow and perforated and adapted to be forced along under the sand by the motor means driving the tractor, pivotal-support means movably mounting the teeth on the tractor whereby the teeth may have their lower ends tilted upwardly at an angle from out of the sand bed and tilted reversely at an angle down into the sand bed, a washing caisson within and on which the teeth are carried, and crank means carried on the tractor and operatively connected with the washing caisson, said crank means being conveniently accessible to an operator who drives the tractor for raising and lowering the washing caisson.

HIRAM W. BLAISDELL.